L. ESSNER.
POWER TRANSMITTING APPARATUS.
APPLICATION FILED APR. 17, 1920.

1,392,131.                                    Patented Sept. 27, 1921.

Inventor
Leon Essner

By Victor J. Evans
Attorney

Witness

UNITED STATES PATENT OFFICE.

LEON ESSNER, OF BENTON, MISSOURI.

POWER-TRANSMITTING APPARATUS.

1,392,131.  Specification of Letters Patent.  Patented Sept. 27, 1921.

Application filed April 17, 1920. Serial No. 374,737.

*To all whom it may concern:*

Be it known that I, LEON ESSNER, a citizen of the United States, residing at Benton, in the county of Scott and State of Missouri, have invented new and useful Improvements in Power-Transmitting Apparatus, of which the following is a specification.

This invention relates to a power transmitting apparatus for use in connection with automobiles and the like, and by means of which power may be transmitted from the driven wheels of the machine to miscellaneous machinery, and particularly useful for operating corn shellers, fanning mills, grinders, cream separators, etc.

More specifically stated, the invention embodies a rotatable shaft journaled upon a support. and adapted to be rotated from the driven wheels of the motor vehicle, which are disposed in contacting engagement with the shaft, subsequent to the raising of the wheels from the ground.

An important object of the invention resides in providing the shaft with a covering of suitable material to prevent slipping of the wheels of the motor vehicle with respect to the above mentioned shaft.

The nature and advantages of the invention will be better understood when the following detail description is read in connection with the accompanying drawing, the invention residing in the construction, combination and arrangement of parts as claimed.

In the drawing forming part of this specification like numerals of reference indicate similar parts in the several views and wherein:—

Figure 1:
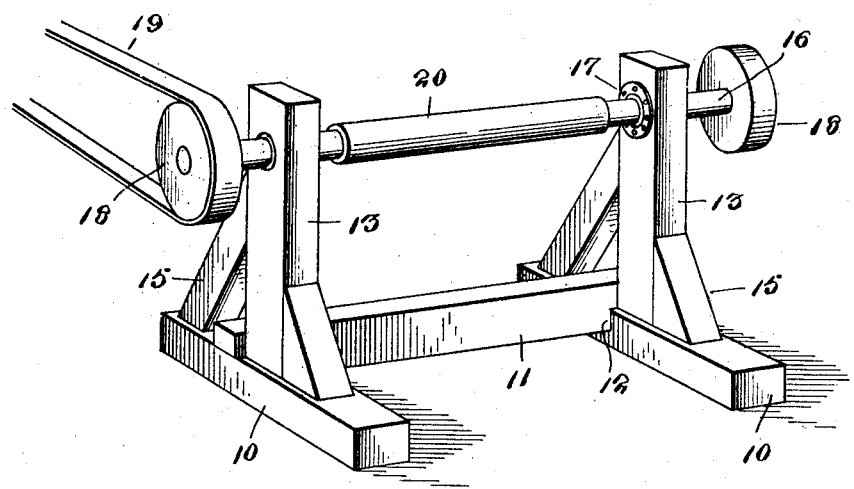
Figure 1 is a perspective view of the apparatus constructed in accordance with my invention.
Figure 2:
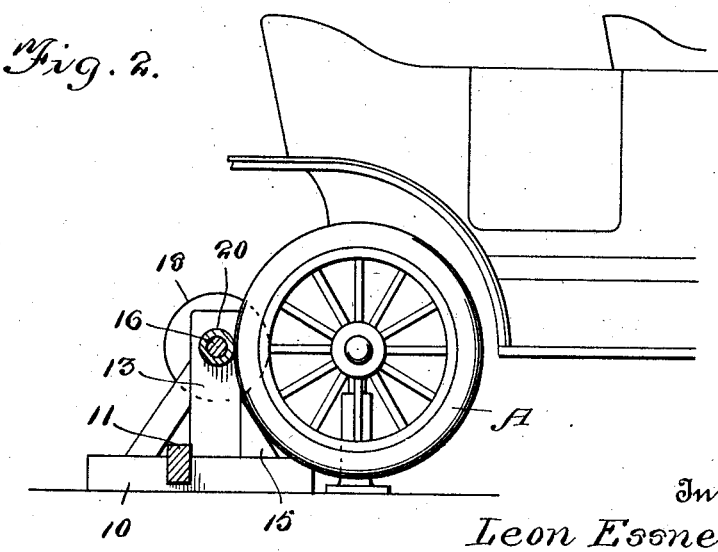
Fig. 2 is a view showing the manner of using the same.

The apparatus constructed in accordance with my invention embodies a base consisting of spaced parallel members 10, which are connected together by means of a bar 11, the latter being provided with shoulders 12 which engage the confronting faces or edges of the members 10 of the base. Rising from each of said members 10 is a standard 13, the latter being rigidly supported through the instrumentality of braces 15. The standards are apertured to receive a shaft 16, the latter being mounted upon the standards for rotation, anti-frictional bearings 17 surrounding the shaft to minimize friction as will be readily understood. The shaft projects an appreciable distance beyond each of the standards, and fixed upon the extremities of the shaft are pulleys 18 over which is trained a belt 19, the latter leading to the particular piece of machinery to be actuated from the shaft, but not herein shown.

In practice the automobile of which the wheels A form a part is first jacked up to space the wheels an appreciable distance above the ground or surface, subsequent to which the apparatus forming the subject matter of the invention is disposed in juxtaposition to the machine whereby one of the rear or driven wheels of the vehicle is arranged in contacting engagement with the shaft 16. Manifestly when the wheel A is driven from the motive power of the car, a rotary motion is imparted to the shaft 16, and the power developed transmitted to the particular machine or apparatus to be actuated through the instrumentality of the belt 19. The invention may be constructed from any suitable material, and vary in proportion. The shaft 16 between the standards is covered with rubber or any other suitable material indicated at 20 to prevent slipping of the wheel A relative to the shaft 16 thus providing an apparatus highly efficient for the purpose intended. The apparatus is simple in construction, and capable of being ported from place to place and conveniently handled.

While it is believed that from the foregoing description the nature and advantages of the invention will be readily apparent, I desire to have it understood that what is herein shown and described is merely illustrative of the preferred embodiment of the invention to which I do not limit myself, and that such changes may be resorted to when desired as fall within the scope of what is claimed.

What is claimed is:—

A power transmitting apparatus for motor operated vehicles, comprising spaced parallel members constituting a base, a transverse member connecting the parallel members and forming part of said base, standards rising from each of the parallel members, reinforcing elements arranged at the opposite sides of each standard and connecting the latter with the base, a shaft journaled between said standards, pulleys carried by the shaft beyond said standards, a sleeve of relatively soft material fitted on said shaft and substantially co-extensive in length with that portion of the shaft positioned between said standards, said sleeve being arranged in contacting engagement with the rear portion of one of the drive wheels of the vehicle when said wheel is spaced from the ground.

In testimony whereof I affix my signature.

LEON ESSNER.